(12) United States Patent
Naccache et al.

(10) Patent No.: US 10,778,351 B2
(45) Date of Patent: *Sep. 15, 2020

(54) PROCESS FOR REINFORCING THE SECURITY OF A PAY TELEVISION SYSTEM BASED ON PERIODIC MANDATORY BACK-COMMUNICATION

(71) Applicant: 4T S.A., Bertrange (LU)

(72) Inventors: David Naccache, Paris (FR); Lukasz Jeczminski, Varsovie (PL); Mateusz Zajakala, Bydgoszcz (PL); Jas Saini, Blonay (CH)

(73) Assignee: 4T S.A., Bertrange (LU)

( * ) Notice: Subject to any disclaimer, the term of this patent is extended or adjusted under 35 U.S.C. 154(b) by 161 days.

This patent is subject to a terminal disclaimer.

(21) Appl. No.: 15/607,684

(22) Filed: May 30, 2017

(65) Prior Publication Data

US 2018/0006750 A1 Jan. 4, 2018

(30) Foreign Application Priority Data

Jun. 29, 2016 (FR) .................................... 16 56081

(51) Int. Cl.
| | |
|---|---|
| *H04L 29/06* | (2006.01) |
| *H04H 60/23* | (2008.01) |
| *H04N 21/4405* | (2011.01) |
| *H04N 21/254* | (2011.01) |
| *H04N 21/00* | (2011.01) |
| *H04N 21/418* | (2011.01) |
| *H04N 21/6334* | (2011.01) |
| *H04N 21/2347* | (2011.01) |

(Continued)

(52) U.S. Cl.
CPC ............. *H04H 60/23* (2013.01); *G06F 21/10* (2013.01); *H04L 63/123* (2013.01); *H04N 21/00* (2013.01); *H04N 21/2347* (2013.01); *H04N 21/2541* (2013.01); *H04N 21/4181* (2013.01); *H04N 21/4405* (2013.01); *H04N 21/4627* (2013.01); *H04N 21/63345* (2013.01); *H04H 2201/11* (2013.01); *H04L 2463/101* (2013.01)

(58) Field of Classification Search
CPC ........... H04N 21/2541; H04N 21/4181; H04N 21/2347; H04N 21/4405; H04H 60/23
See application file for complete search history.

(56) References Cited

U.S. PATENT DOCUMENTS

2004/0093614 A1 5/2004 Sakurai et al.
2004/0233811 A1* 11/2004 Duffield ................. H04N 5/913
369/53.21

(Continued)

FOREIGN PATENT DOCUMENTS

| | | |
|---|---|---|
| EP | 0891084 A2 | 1/1999 |
| WO | 2015011421 A1 | 1/2015 |

*Primary Examiner* — Shewaye Gelagay
*Assistant Examiner* — Michael M Lee
(74) *Attorney, Agent, or Firm* — Mark M. Friedman (57) ABSTRACT

The invention relates to a process for transmitting streaming digital content to a client device for access to digital content. The inventive process makes it possible, in particular, to apply an access control system to the protection of direct-mode video streams. The process also makes it possible to significantly improve the security and safety of the system, based on a periodic mandatory back-communication on the part of the client device.

6 Claims, 2 Drawing Sheets

(51) Int. Cl.
*H04N 21/4627* (2011.01)
*G06F 21/10* (2013.01)

(56) References Cited

U.S. PATENT DOCUMENTS

| | | | | |
|---|---|---|---|---|
| 2006/0235800 A1* | 10/2006 | Furlong | ............... | G06F 21/105 |
| | | | | 705/59 |
| 2006/0294547 A1* | 12/2006 | Bon | ............... | G06Q 30/02 |
| | | | | 725/46 |
| 2010/0239086 A1* | 9/2010 | Johnston | ............... | H04L 9/083 |
| | | | | 380/43 |
| 2011/0113443 A1* | 5/2011 | Yu | ............... | H04N 7/1675 |
| | | | | 725/28 |
| 2013/0216041 A1* | 8/2013 | Chen | ............... | H04N 7/1675 |
| | | | | 380/239 |
| 2015/0101069 A1* | 4/2015 | Stappenbeck | ............... | G06F 21/10 |
| | | | | 726/30 |
| 2015/0381682 A1* | 12/2015 | Rao | ............... | G06F 16/972 |
| | | | | 709/219 |
| 2016/0155001 A1* | 6/2016 | Betley | ............... | H04N 21/8549 |
| | | | | 725/116 |
| 2016/0364553 A1* | 12/2016 | Smith | ............... | G06F 21/105 |

* cited by examiner

Fig. 3

PROCESS FOR REINFORCING THE SECURITY OF A PAY TELEVISION SYSTEM BASED ON PERIODIC MANDATORY BACK-COMMUNICATION

FIELD OF THE INVENTION

The field of the invention is that of protection of digital content, and in particular audiovisual content.

More specifically, the invention relates to a technique that is applicable, inter alia, to access control and content protection systems, the objective of which is to prevent unauthorized access to the content produced by digital content providers.

More specifically, the present technique involves the implementation of an architecture for protection of digital content, in particular audiovisual content, in processors, microprocessors, computers, decryption boxes and dedicated computation devices. Such an architecture provides (1) better security than the prior art, (2) ensures backward compatibility with existing systems dedicated to the protection of content.

The present technique very specifically concerns pay television networks and Internet content broadcasters, which it is desirable to enable access to the direct-mode digital content broadcast only to users who have actually acquired the rights to access such content.

The invention has numerous applications, such as, for example, the protection of entertainment content, teleconferences, video streams from mobile telephones, or any application in which direct-mode digital content broadcast should be accessible only to a limited group of recipients or subscribers.

More generally, the invention may be applied in any case in which such systems for broadcasting direct-mode content, i.e. streaming, are used or deployed.

The invention relates in particular to a process for transmitting streaming digital content over an Internet network for data communication structured according to a multicast routing mode. The invention also relates to a computer program product for implementing such a process, as well as a recording medium on which a computer program for implementing such a process is recorded.

PRIOR ART

The present invention is more specifically concerned with describing the problems existing in the field of controlled broadcasting of digitized audiovisual content, with which the inventors have been confronted. The invention is not limited, of course, to this particular field of application, but is of interest in any technique aimed at ensuring the protection of audiovisual content or any technique that will be faced with close or similar problems.

Conditional Access Systems

The terms "conditional access" (or "CA") and "conditional access systems" ("CA systems" or "CAS") designate a group of devices, processes and software intended to protect digital or analog content. The CAS implement the protection of content by ensuring that a set of requirements are complied with before access to the content is authorized. The term CAS is often associated with digital television systems (both those broadcast via satellite and those broadcast by cable) even if, historically, the first CAS were analog (e.g. the Videocrypt system of the Thomson Consumer Electronics company).

The Digital Video Broadcasting standard (DVB) defines the CAS standards in specification documents referred to as DVB-CA ("Conditional Access"), DVB-CSA ("Common Scrambling Algorithm") and DVB-CI ("Common Interface"). These standards define a method enabling a digital television stream to be scrambled while enabling users having a valid smart card for decryption to access said stream. DVB Conditional Access specifications are available online and are known to those skilled in the art. Hundreds of millions of pay television decoders currently implement DVB specifications.

The protection of the content is performed by combining the scrambling of the video signal and the encryption of the scramble keys. The video data stream is scrambled with a so-called "control word" (or "CW") secret 48-bit cryptographic key. The knowledge of a CW at a given moment in time cannot seriously compromise the security of the conditional access system insofar as the content providers change the CW several times per minute. The validity period of a given key (said period being a parameter of the CAS) is called the "cryptographic period" (or "Crypto Period" or "CP"). The CW is generated so that the knowledge of the CW of CP number n does not make it possible to guess or calculate CWs of CPs number n+1 and beyond. The knowledge of the CW of CP number n moreover does not make it possible to guess or calculate the CWs of CPs n−1 and before. The DVB specifications recommend using a physical process for doing this.

In order for the recipient to be capable of decrypting the incoming data stream, the recipient device must be constantly updated of successive CWs. In practice, the recipient device must even be informed of CWs shortly in advance so as to prevent any interruption in the content display for the user.

Encryption is used to protect the CW during its transmission to the recipient: the CW is encrypted so as to become an Entitlement Control Message (or "ECM"). The CAS of the recipient device decrypts the ECM in order to extract the CW only if the recipient is authorized to do so. The ability to do this is sent to the recipient in the form of an Entitlement Management Message (or "EMM"). The EMMs are specific to each subscriber, identified by means of the smart card inserted in its decryption box, or to a group of subscribers. The EMMs are normally transmitted or renewed once per month. After attacks in the field, it appeared that such an EMM broadcasting frequency is not sufficient to prevent fraud. Thus, the TPS company reduced the EMMs broadcasting interval to 12 minutes. This frequency may differ greatly between content providers: for example, BskyB uses a validity period of one-and-a-half months. When the Nagravision 2 system was compromised, the Digital+ company began to renew the EMMs at three-day intervals in order to disrupt the display of content by pirates.

The content of the ECMs and EMMs is not standardized. Thus, their formats are dependent upon the specific CASs in use.

The CW may come to the recipient device via several ECMs at the same time, which enables multiple CASs to be used at the same time. This technique, specified by DVB, and known as "Simulcrypt", makes it possible to save bandwidth and encourages multiple operators to multiplex their information and cooperate. The Simulcrypt DVB is very common in Europe. Certain channels, such as CNN International Europe broadcast from Hot Bird satellites, may use up to 7 different CASs in parallel.

The decryption cards are read and sometimes updated with specific viewing rights, i.e. via a conditional access module (or "CAM"), a reader of cards in PCMCIA format (also called "PC Card" format) satisfying the usual DVB-CI standards, or via an ISO/IEC 7816-compatible onboard card reader, such as that of Sky Digibox.

Given the frequent and common use of the CA in DVB systems, there are numerous illegal tools enabling the DVB encryption to be facilitated or bypassed. There exist CAM and multiformat CAMs emulators. Multiformat CAMs may read multiple card formats or directly decrypt a compromised CAS. Most multiformat CAMs and all CAMs capable of decrypting a signal are based on the reverse engineering of the corresponding CAS. Numerous CASs have been compromised at this point.

Digital Rights Management

Digital Rights Management (or "DRM"), or Technical Protection Measures, are designed to control the use of digital works.

DRM may be applied to all types of physical digital media (disks, Digital Versatile Disc, Blu-ray, software, etc.) or transmission (broadcasting, Internet services, etc.) owing to a CAS, as described above.

The DRM technical devices or software may be targeted at:
restricting the reading of the information medium to a given geographic area (for example, DVD regions);
restricting the reading of the information medium to specific material (for example, smart phone or tablet versions);
restricting the reading of the information medium to a manufacturer or vendor (to block competition);
restricting or preventing private copy of the information medium (transfer to an external device);
restricting or locking certain read functions of the medium (deactivation of fast-forward on certain passages of a DVD). This is very useful in order to require exposure to advertisements;
identifying and digitally watermarking any work or any reading or recording equipment (to facilitate tracking of unauthorized copies, but especially to prevent personalization and therefore control of a technology, for example to prevent the installation of another operating system on a computer).

The technical measures use an encryption of the work combined with a CA. The publisher or distributor who uses this CAS provides the access control key of the product only in exchange for a proof of purchase or subscription for access to it (subscription to a pay channel, VOD, download, etc.). The access to read (and/or copy) the document thus protected is then authorized only for the equipment or for the software identification certified by the provider.

Notions concerning the technical protection measures for content exist in the law (DMCA in Europe and in the United States, DADVSI in France) and are the subject of an international agreement. The law recognizes the CA as a protection measure and punishes users who infringe it or publish secrets thereof.

A DRM architecture is based on the encryption of works. Only a device having the decryption key is capable of consulting the work. This principle presents the problem of inviolability of the equipment used by the public to consult the works, so that the decryption keys remain secret. Thus, the secrets of DVD readers were penetrated and DVDs are now capable of being decrypted by software without keys. To preserve inviolable secrets in the computer of each user, manufacturers are developing DRM systems deeply embedded in the hardware of the computers. The objective is for each computer to be capable of being identified remotely (by Internet connection) and reliably. Thus, a client-server architecture makes it possible to continuously verify the use and dissemination of each copy of a work.

A number of manufacturers already implement purely software-based DRM systems, which are, however, subject to circumvention.

This is how such a DRM system generally works:
The content server S has content C protected by copyright (for example music);
The client K is the software or the peripheral enabling C to be consulted (for example, a multimedia reader or a digital music player);
When a user U wants to download a file F, K provides a unique identifier to S. S encrypts F (in order to obtain C) specifically for U;
C is then transferred from S to K, usually via the Internet;
When U wants to consult the content F that he or she has thus downloaded, the reader verifies that there is already a license for F. If the reader does not have a license, it connects to S. If U is authorized (for example by having made the payment), the reader downloads a license L. L is a data structure that contains the decryption key as well as the conditions of use of the content F. L is protected in confidentiality and integrity;
The reader verifies that the conditions of use defined by L are complied with. In this case, the reader may decrypt C with the decryption key stored in the license in order to deliver F to U.

However, if U changes clients (new software, new computer, new music player), he or she will have to request a new license L' according to the conditions of the contract made with the provider (for example, iTunes allows seven licenses associated with a hardware change without restriction on the period for the purchase of a title).

Disadvantages of the Prior Art

The traditional television broadcasting environments are based on CASs for providing services for managing access rights and scrambling (encryption) of audio visual content. These systems normally use a smart card inserted into the STB. The smart card is used to manage content keys and periodically provides said content keys to the descrambling system. The smart cards may be coupled with a specific STB so as to be usable only with this decoder. This classic system, the security level of which is known and studied, has already been used for three decades. In spite of this, the disadvantages of this classic system are known to television network operators and a person skilled in the art. One of the major disadvantages of these systems lies in the fact that once the rights have been transmitted via an EMM, these rights remain the property of user. Thus an attacker controlling the communication between the STB and the network may access the content without restriction. Admittedly, if the STB is equipped with a real-time clock, the CAS may take into account the expiration of the EMM, but it is difficult to secure a real-time clock. Therefore, an attacker controlling both the communication between the STB and the network and the real-time clock of the STB may effectively access the content.

SUMMARY OF THE INVENTION

The inventive technique proposed does not have at least some of the disadvantages of the prior art.

The present invention makes it possible to protect streaming digital content and on-demand digital content even when faced with an attacker controlling both the link between the STB and the network and the real-time clock of the STB.

The present invention also makes it possible to reduce the cost and complexity of hybrid systems enabling protection at the same time of direct-mode digital content and not only of on-demand digital content.

To these ends, the invention proposes, according to a first aspect, a process for transmitting streaming digital content on an Internet data communication network, said Internet network being structured according to a multi-broadcasting routing mode, said process being implemented by a digital content transmission system comprising:
  a digital rights management device including:
    at least one digital content encryption module, connected to a streaming digital content source via said Internet data communication network;
    a module for storing cryptographic encryption keys and content identifiers, connected to the encryption module;
  a client device for accessing said streaming digital content, connected to the digital rights management device via said Internet data communication network, and including:
    a module for access, browsing and display of said streaming digital content;
    a client module for digital rights management, connected to the module for access, browsing and display of said streaming digital content;
  each module being formed by a software component, a hardware component, or a set of hardware and software components;
  the process including the following steps:
    the transmission to the encryption module of digital content, by the digital content source, of streaming digital content, via the Internet data communication network;
    the encryption, by the digital content encryption module, of said digital content via a secret cryptographic encryption key;
    the determination, by the digital content encryption module, if the client device has previously transmitted to the encryption module the value of a variable representative of a state of the client device; and, depending on the particular case, the comparison, by the digital content encryption module, between the current value and preceding value of said variable, then the determination, by the encryption module, of a level of similarity between the current value and the preceding value of said variable;
    if, on completion of the step of determining a level of similarity, the encryption module determines that the level of similarity is greater than a predetermined threshold level:
      the transmission to the cryptographic encryption key and content identifier storage module, by the digital content encryption module, of access criteria required for a given channel, said channel containing all or some of said digital content;
      the translation, by the cryptographic encryption key and content identifier storage module, of said required access criteria in the form of a specific content identifier and a specific content key;
      the transmission to the digital content encryption module, by the cryptographic encryption key and content identifier storage module, of said specific content identifier and said specific content key;
      the insertion, by the digital content encryption module, of said specific content identifier and said specific content key, in the encrypted digital content, a multiplexed data stream being obtained upon completion of this insertion step, the multiplexed data stream containing said encrypted digital content, said specific content identifier and said specific content key;
      the transmission to the module for access, browsing and display of the client device, by the digital content encryption module, of said multiplexed data stream via said Internet data communication network;
      the recovery, by the module for access, browsing, and display, of the specific content identifier contained in the multiplexed data stream, and the transmission of said digital content identifier to the client digital rights management module;
      the verification, by the client digital rights management module, if an object corresponding to said specific content identifier exists, and, depending on the particular case, the delivery of a right to access, browse, and display digital content to the access, browsing and display module.

Advantageously, in the step of determining whether the client device has previously transmitted, to the encryption module, the value of a variable representative of a state of the client device, the digital content encryption module verifies whether the client device has transmitted the value of said variable from a predetermined number of time units.

Advantageously, the variable representative of a state of the client device is a list of data indicative of the state of the device; and the determination, by the encryption module, of a level of similarity between the current value and the preceding value of said variable involves a comparison of the data of the current list and the data of the preceding list with one another so as to determine an identical level of data between the two lists.

Advantageously, the data of the data list indicating the state of the device forms a history of the display of digital content by the user.

Advantageously, the digital content encryption module includes a first sub-module for scrambling digital content, and a second sub-module for generating control rights messages, connected to the first sub-module.

Advantageously, the first digital content scrambling sub-module is a multiplexer.

Advantageously, the Internet data communication network is a network compliant with the IP television standard, and the streaming digital content is a direct-mode audiovisual television stream.

Advantageously, the digital rights management device and the client device form a client-server architecture, at least one of the modules of the device for digital rights management being a server.

The invention also relates, according to a second aspect, to a computer program product downloadable from a communication network and/or recorded on a computer-readable medium and/or capable of being run by processor, including program instructions, said program instructions being suitable for implementing the steps of the digital content transmission process as described above when the program product is run on a computer.

This computer program product may use any programming language, and be in the form of a source code, an object code or an intermediate code between source code and object code, such as in a partially compiled form or in the form of a circuit synthesized from hardware description language (such as VHDL or Verilog) or in any other desirable form.

The invention finally relates, according to a third aspect, to a recording medium on which a computer program is recorded, including program code instructions for implementing the steps of the digital content transmission process as described above.

The recording medium may be any entity or device capable of storing the program. For example, that medium may comprise storage means, such as a RAM, a flash memory, a USB key, a ROM, for example a CD ROM or a microelectronic circuit ROM, or magnetic recording means, for example a floppy disk or a hard disk.

In addition, the recording medium may be a transmissible medium such as an electrical or optical signal, which may be routed via an electrical or optical cable, by radio or by other means. The program according to the technique proposed may in particular be downloaded on an Internet-type network.

Alternatively, the recording medium may be an integrated circuit in which the program is incorporated, the circuit being suitable for executing or for being used in the execution of the process in question.

According to one embodiment, the technique proposed is implemented by means of software and/or hardware components. From this perspective, the term "module" may correspond in this document to a software component, a hardware component or a set of hardware and software components.

A software component corresponds to one or more computer programs, one or more procedures or sub-programs of a program, or more generally to any element of a program, or software capable of implementing a function or a set of functions, according to what is described below for the module concerned. Such a software component is run by a data processor of a physical entity (terminal, server, gateway, router, etc.) and is capable of accessing the hardware resources of said physical entity (memories, recording media, communication bus, electronic input/output cards, user interfaces, etc.).

Similarly, a hardware component corresponds to any element of a hardware assembly capable of implementing a function or a set of functions, according to what is described below for the module concerned. It may be a hardware component that is programmable or with an integrated processor for running software, for example a processor, a dedicated cryptographic coprocessor, a central unit, a supercomputer, an integrated circuit, a smart card, a memory card, an electronic card for running micro-software (firmware), etc.

Each component of the system described above of course implements its own software modules. The various embodiments mentioned above can be combined with one another for implementation of the proposed technique.

Other features and advantages will become clearer in view of the following description and the associated figures.

DESCRIPTION OF THE FIGURES

Other features and advantages of the technique proposed will become clearer in view of the following description of a preferred embodiment, provided simply as an illustrative and non-limiting example, and appended drawings, wherein.

DESCRIPTION

Figure 1:
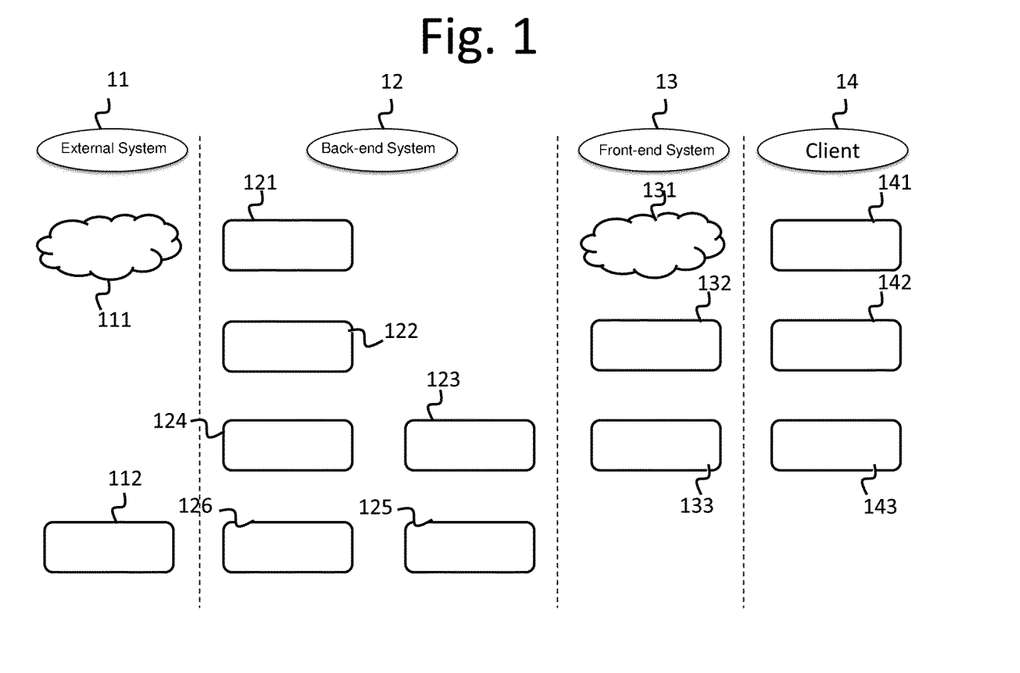
FIG. 1 shows the inventive system.

The system of the invention is comprised of the following modules:

The modules belong to three categories: a "Back-End System" category (12), a "Front-End System" category (13) and a "client" category (14); and are interfaced with a fourth category, namely an "external system" category (11).

The "external system" category comprises the following elements:

The CDN Source (111) ("Content Delivery Network"): The CDN Source provides audiovisual content to the inventive system. The audiovisual content is acquired in form of a clear (intelligible) signal of various types of content providers (for example, satellite connections, content aggregators, direct broadcaster connections, etc.). The content is delivered to the head end in the form of an MPEG stream ("MPEG Single Program Transport Stream multicast") with varying flow rates and varying video encoding formats (MPEG/AVC). This information travels via a plurality of Internet traffic points for content exchange.

The CRM System (112): The customer relationship management system manages the subscribers, their subscriptions, their packages and commercial offers, the devices for accessing subscriber content and subscriber rights. The CRM System (112) provides the information necessary for the billing process. The CRM System (112) is used by the commercial and operational services of the operator to assign content access rights to the clients and manage their technical data and billing data. The CRM System (112) is also designated by the acronym "SMS" (for "Subscriber Management System"). The CRM System (112) may be housed on the premises of an external service provider or, by contrast, be housed by the entity using the inventive system.

The "Back-End System" category comprises the following elements:

The scrambler (121): A scrambler is a multiplexer having the capacity to scramble an incoming MPEG transport stream. A typical scrambler uses "TS-packet"-type scrambling with a CW rotation and an AES-128 encryption of the video and audio signal and content of the subtitles. Another example of an embodiment is the use of DVB-CSA. To enable fast scrolling (forward or backward) of content, certain content portions may be left in clear form (PUSI packets, or, for example, 5% of packets).

The ECM generator (122): generates ECMs ("Entitlement Control Messages") so that the multiplexer inserts said ECMs into the scrambled transport stream. The interface between the scrambler (121) and the ECM generator (122) is defined by the "Head-End Simulcrypt Standard (ETSI TS 103 197)". The ECMs contain the DRM content identifier corresponding to a given package. The ECMs generator (122) uses a key server (124) to obtain the content key corresponding to the DRM content identifier received from the scrambler (121).

The DRM Back-End System (123): is a database of DRM objects and transactions that must be recovered by DRM Clients. Each DRM object is, for example, a digital content access license, a subscription node or a link between a DRM user and a digital content identifier. Thus, the DRM Back-End System (123) combines both the technical information of the DRM objects (DRM users, subscription nodes, content identifiers) and the associated commercial logic information (packages, devices). The DRM Back-End System (123) provides the DRM Front-End System (132) with all of the data necessary for generating the DRM elements such as licenses, nodes and links.

The key server (124): Manages the content identities and the content keys of all of the DRM packages. The key server (124) offers secure database services to the other components of the system when said other components of the system need to access content keys corresponding to specific content identifiers.

The Token Back-End System (125) is the core of the commercial logic of the Back-End System. The Token Back-End System (125) generates action tokens (lists of operations) for the DRM Clients (142), indicating to the DRM Clients (142) on which data the DRM Clients (142) should query the DRM Front-End System (132). The Token Back-End System (125) applies the CRM data to the subscriber packet data in order to generate the transactions for recovery of DRM objects corresponding to the subscriptions in the DRM Back-End System (123). On the basis of the CRM data, the Token Back-End System (125) also manages the current state of the status of the subscriber's content display device. The Token Back-End System (125) also manages the package data in the database of the DRM Back-End System (123).

The CRM Module (126) is the part of the inventive system responsible for communication with the CRM System (112). The CRM Module (126) is a content provider abstraction layer enabling integration of different CRM Systems. It is sufficient for a minimal set of required operations to be supported for any CRM System to be capable of being used to manage subscriber package data.

The "Front-End System" category comprises the following elements:

The Content Delivery Network (or "CDN") (131) for IPTV channels: The channels are delivered to the operators in a scrambled multicast UDP MPEG SPTS format. This content delivery is performed via multiple Internet exchange points. The operators receive all of the IPTV traffic on their premises using a protocol-independent multicast router (or PIM router) or dynamically subscribe to the content required via the IGMP protocol ("Internet Group Management Protocol") using a PIM head-end router.

The DRM Front-End System (132) is a DRM server provided by the Intertrust company (the DRM Front-End System (132) is also called "Bluewhale Server"). The DRM Front-End System (132) is responsible for secure communication with the DRM Clients (142). The DRM Front-End System (132) uses the DRM Back-End System (123) to recover the commercial data necessary for generating DRM objects required by the DRM Clients (142).

The Token Front-End System (133) is an HTTP Proxy server accessible by means of the Internet. The Token Front-End System (133) provides secure access to the services offered by the Token Back-End System (125) intended for User Interface UI Applications (143).

The "Client System" category comprises the following elements:

The IPTV Client (141) is part of the application stack of the subscriber's display device. The IPTV Client (141) is responsible for access to the IPTV content, and browsing of the content (or "media parsing"). The IPTV Client (141) is also responsible for displaying the content ("playout"). The IPTV Client (141) manipulates the incoming IPTV streams and the encoding thereof. The IPTV Client (141) uses the DRM Client (142) to obtain the keys necessary for descrambling the content.

The DRM Client (142) is a software library of the Intertrust company (known to a person skilled in the art as "Wasabi/ExpressPlay SDK"). The DRM Client (142) is on-board the subscriber's content access device. The DRM Client (142) communicates confidentially with the DRM Front-End System (132) to obtain the DRM objects and licenses and offers an application programming interface (or "API") to the content display subsystem (or "media playout subsystem") making it possible to verify the content rights with respect to the available licenses. The DRM objects are recovered using "action tokens" generated by the Token Back-End System (125) and are provided to the DRM Client (142) by the UI Application (143).

The User Interface UI Application (143) is a high-level user interface present in the subscriber's content access device (for example, telephone or tablet): Periodically, or in response to actions of the subscriber, the User Interface UI Application (143) contacts the Token Front-End System (133) to recover an "action token" for DRM rights. The action token is then passed on to the DRM Client library (142), which carries out the rights recovery operation. The User Interface UI Application (143) provides the user with an interface making it possible to start the display of content (for example, IPTV channel zapping) and enabling local management of DRM authorizations in the DRM Client library (142).

Description of a Particular Embodiment

In this embodiment, the system described above implements a two-phase operation:

DRM Rights Acquisition Phase

1. The UI application (143) triggers a DRM rights update by sending the device identifier ("device ID") and the Digital Rights Management identifier ("DRM ID") to the token portal (133) of the inventive system.

2. The request is transmitted by the Token Portal (133) to the Token Back End (125).

3. On the basis of the "device ID", the token back end (125) queries the CRM module (126) to recover the user rights.

4. The request is transmitted by CRM module (126) to the external subscriber management system (112).

5. The rights information recovered by the token back end (125) is sent to the DRM server (123). Said rights information is translated into DRM objects by the DRM back end (123). In each DRM object recovery transaction for a DRM client, the DRM back end assigns a unique identifier (ID).

6. The UI application (143) gives an instruction to the DRM client (142) to recover the DRM objects by creating and by passing to the DRM front end (132) an action token containing the actions to be carried out as well as their respective IDs.

7. The DRM client (142) contacts the DRM server (123) via the DRM front end (132) for each of the actions specified by passing a transaction ID in the action token.

8. The DRM front end (132) recovers from the DRM back end (123) the DRM object corresponding to the DRM client (142) on the basis of the transaction ID.

9. To construct a license for the DRM content, the DRM back end (123) contacts the key server (124) in order to translate the content ID into a key forming part of the license.

Figure 2:
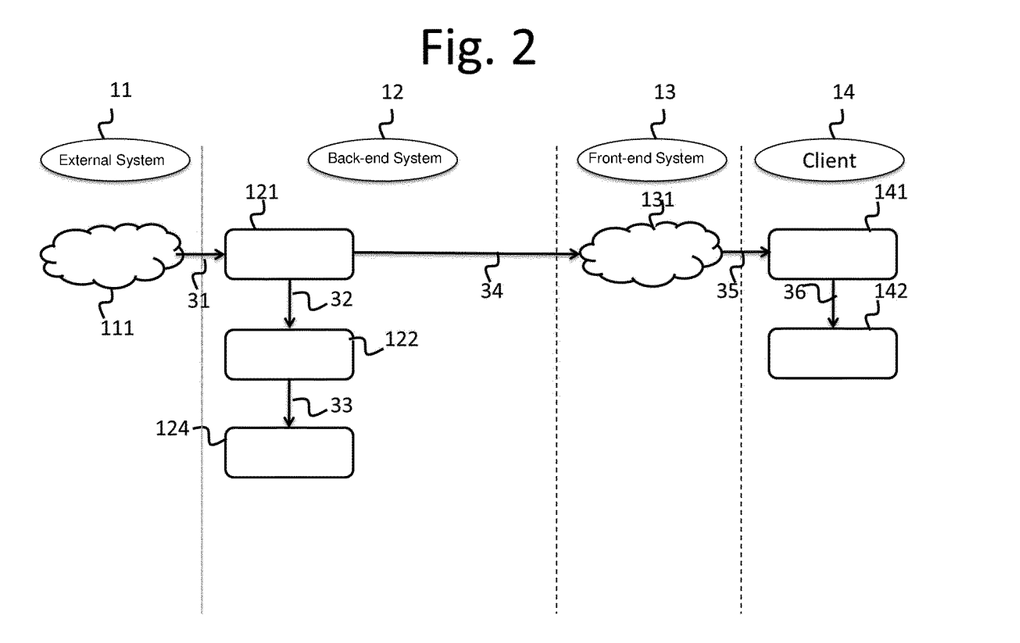
FIG. 2 shows the process for transmission of streaming digital content according to the invention, implemented by the system of FIG. 1.

Content Delivery and Decryption Phase, Illustrated in FIG. 2

1. The content in clear (31) is provided by the CDN source (111) to the scrambler (121) via a multicast Single-Program Transport Stream ("MPEG-TS over UDP").

2. The scrambler (121) contacts (32) the ECM generator (122) in order to construct an ECM datum containing the control word (33) and the access criteria required for a given channel. The ECM generator (122) verifies whether the client device (14) has already contacted the ECM generator (122). In a particular embodiment, the ECM generator verifies that the client device (14) receiving the ECM has contacted the ECM generator (122) since at least T time units. If not, the ECM generator (122) does not go on to step 3. During the contact between the ECM generator (122) and the client device (14), the ECM generator verifies whether the client device (14) has previously transmitted, to the ECM generator, the value of a variable E representative of a state of the client device (14). More specifically, during the contact between the ECM generator (122) and the client device (14), the ECM generator remotely verifies that the state E of the client device (14) is consistent with that of the client device during the previous contact. For example, state E may be a list {time_date_start[i], time_date_end[i], channel[i]} containing the user display history. It is considered in the present document that "state E[t] is consistent with state E[t−1]" if, after having determined a level of similarity between these two states, said level of similarity is greater than a predetermined threshold. In the particular embodiment described above, in which state E is a list containing the user display history, "state E[t] is consistent with state E[t−1]" if the range of intersection between the lists E[t] and E[t−1] is great enough, i.e. if the common elements between the lists E[t] and E[t−1] represent a percentage greater than a predetermined threshold percentage (for example 25% of the elements). When the client device (14) realizes that its current list E[t] differs significantly from E[t−1] (for example 50% of the elements), it triggers an interaction with the ECM generator. Thus, a pirate clone will very quickly be desynchronized and cease to operate.

3. If the ECM generator (122) determines that the level of similarity between the two states E[t] and E[t−1] is greater than a predetermined threshold, the ECM generator (122) uses a key server (124) to translate the access criterion into a specific content ID and a specific content key.

4. The scrambler (121) inserts the ECM (33) thus constructed into the encrypted data stream, thereby obtaining a multiplexed datum (34) send to the CDN (131).

5. The encrypted data stream (35) is delivered to the IPTV client (141) via the CDN content delivery network (131).

6. The client device (14) recovers the content ID from the ECM data and consults (36) the DRM client (142) in order to verify whether a license for said content ID exists. If so, the rights are granted.

OTHER FEATURES AND ADVANTAGES

Figure 3:
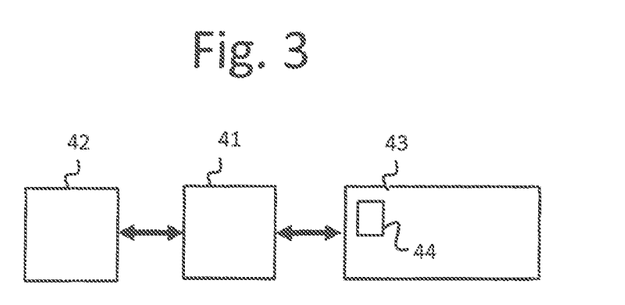
FIG. 3 shows a hardware and software architecture implementing the invention.

A practical application of the inventive system is typically implemented on a hardware device, the hardware architecture of which is illustrated in FIG. 3. A processor 41, for example a microprocessor, is connected to a data input and output interface means 42, and to a memory 43 in which the processor reads instructions encoding a program 44 implementing the inventive process. The memory 43 is also used to read and write data, encrypted messages and keys.

A major advantage of the inventive system with respect to the prior art is the following: a pirate clone created at a time t will change from E[t] to E'[t+1]. During this time, the legitimate system will change to E[t+1]. Since the clone and the legitimate system are used by two different users, with a very high probability that E'[t+1] will differ from E[t+1], this difference will quickly be accentuated and be detected by the CAS system. This will result in stopping the operation of the clone. Thus, the system and the process according to the invention are designed so as to enable the security and safety of the system to be significantly improved.

The invention therefore effectively and definitively solves all of the disadvantages of the prior art.

The invention claimed is:

1. A method for transmitting streaming digital content on an Internet data communication network, the Internet network being structured according to a multi-broadcasting routing mode, the method comprising the steps of:

transmitting, by a digital content source, streamed digital content, to a digital content encryption module of a digital rights management device, via the Internet data communication network;

encrypting, by the digital content encryption module, the streamed digital content via a secret cryptographic encryption key to generate encrypted digital content;

determining, by the digital content encryption module, that a client device, connected to the digital rights management device via said Internet data communication network and configured to access the streamed digital content, has contacted the digital content encryption module within a contact period of T time units;

determining, by the digital content encryption module during the contact period of T time units, that the client device previously transmitted to the digital content encryption module during a previous contact period that is prior to the contact period of T time units, a value of a variable representative of a history of digital content displayed by the client device to a user of the client device, and, comparing, by the digital content encryption module, a current value of the variable to a preceding value of the variable, and then determining, by the digital content encryption module, a level of similarity between the current value and the preceding value of the variable, wherein the current value of the variable is representative of the history of the digital content displayed by the client device to the user of the client device during the contact period of T time units, and wherein the preceding value of the variable is representative of the history of the digital content displayed by the client device to the user of the client device during the previous contact period; and if, upon completion of the step of determining a level of similarity, the digital content encryption module determines that the level of similarity is greater than a predetermined threshold level:

transmitting, by the digital content encryption module, to a storage module that stores cryptographic encryption keys and content identifiers, access criteria required for a given channel containing all or some of said digital content;

translating, by the storage module, the access criteria for the given channel in the form of a specific content identifier and a specific content key;

transmitting, by the storage module, to the digital content encryption module, the specific content identifier and the specific content key;

inserting, by the digital content encryption module, the specific content identifier and the specific content key, in the generated encrypted digital content, to generate a multiplexed data stream containing the generated encrypted digital content, the specific content identifier, and the specific content key;

transmitting, by the digital content encryption module, to an access module, of the client device, configured to access, browse and display the streamed digital content, the multiplexed data stream via the Internet data communication network;

recovering, by the access module, of the specific content identifier contained in the multiplexed data stream, and transmitting the specific content identifier to a client digital rights management module of the client device; and verifying, by the client digital rights management module, that an object corresponding to the specific content identifier exists, and, delivering a right to access, browse, and display digital content to the access, wherein each of the digital content encryption module, the storage module, the access module, and the client digital rights management module are performed by a software component, a hardware component, or a set of hardware and software components.

2. The method according to claim 1, wherein the digital content encryption module includes a first sub-module for scrambling streamed digital content, and a second sub-module for generating control rights messages, connected to the first sub-module.

3. The method according to claim 2, wherein the first sub-module is a multiplexer.

4. The method according to claim 1, wherein the Internet data communication network is a network compliant with the IP television standard, and wherein the streamed digital content is a direct-mode audiovisual television stream.

5. The method according to claim 1, wherein the digital rights management device and the client device form a client-server architecture, and wherein at least one of the digital content encryption module or the storage module being a server.

6. The method according to claim 1, wherein the level of similarity is greater than 50%.

\* \* \* \* \*